(12) United States Patent
Mohan et al.

(10) Patent No.: US 12,461,240 B2
(45) Date of Patent: Nov. 4, 2025

(54) TIME-OF-FLIGHT APPARATUS AND METHOD

(71) Applicant: Sony Semiconductor Solutions Corporation, Kanagawa (JP)

(72) Inventors: Rachit Mohan, Stuttgart (DE); Ward Van Der Tempel, Muizen (BE); Michiel Timmermans, Stuttgart (DE); Ye Chen, Stuttgart (DE); Qing Ding, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1074 days.

(21) Appl. No.: 17/440,681

(22) PCT Filed: Mar. 12, 2020

(86) PCT No.: PCT/EP2020/056656
§ 371 (c)(1),
(2) Date: Sep. 17, 2021

(87) PCT Pub. No.: WO2020/193161
PCT Pub. Date: Oct. 1, 2020

(65) Prior Publication Data
US 2022/0179087 A1 Jun. 9, 2022

(30) Foreign Application Priority Data
Mar. 25, 2019 (EP) .................................... 19165010

(51) Int. Cl.
*G01C 3/08* (2006.01)
*G01S 7/4914* (2020.01)
*G01S 17/894* (2020.01)

(52) U.S. Cl.
CPC .......... *G01S 17/894* (2020.01); *G01S 7/4914* (2013.01)

(58) Field of Classification Search
CPC ............................ G01S 17/895; G01S 7/4914
See application file for complete search history.

(56) References Cited

U.S. PATENT DOCUMENTS

2011/0037969 A1 2/2011 Spickermann et al.
2012/0268727 A1* 10/2012 Schrey .................... G01C 3/08
250/214 R
(Continued)

FOREIGN PATENT DOCUMENTS

JP         2015049062 A  *  3/2015  ........... G01N 21/956
WO  PCT/EP2020/056656     4/2020

OTHER PUBLICATIONS

International Search Report and Written Opinion mailed Apr. 8, 2020 in connection with International Application No. PCT/EP2020/056656.

*Primary Examiner* — Mark Hellner
(74) *Attorney, Agent, or Firm* — Wolf, Greenfield & Sacks, P.C.

(57) ABSTRACT

A time-of-flight apparatus has a light source for emitting a light pulse to a scene; a photo-detection portion for detecting at least the light pulse reflected from the scene within a first photo-detection time interval, wherein the photo-detection portion includes at least one photo-detection element; and a measurement circuitry configured to: drive, within a measurement time interval including the first photo-detection time interval, the at least one photo-detection element for detecting the light pulse reflected from the scene, and drain, within the measurement time interval and after the first photo-detection time interval, electrons from the at least one photo-detection element.

18 Claims, 4 Drawing Sheets

(56) References Cited

U.S. PATENT DOCUMENTS

2015/0146089 A1* 5/2015 Ovsiannikov ........... G01S 17/89
348/362
2016/0306045 A1 10/2016 Van Der Tempel et al.
2018/0176498 A1 6/2018 Elkhatib et al.
2019/0081095 A1 3/2019 Hanzawa et al.

* cited by examiner

TIME-OF-FLIGHT APPARATUS AND METHOD

CROSS-REFERENCE TO RELATED APPLICATIONS

This application claims the benefit under 35 U.S.C. § 371 as a U.S. National Stage Entry of International Application No. PCT/EP2020/056656, filed in the European Patent Office as a Receiving Office on Mar. 12, 2020, which claims priority to European Patent Application Number 19165010.0, filed in the European Patent Office on Mar. 25, 2019, each of which is hereby incorporated by reference in its entirety.

TECHNICAL FIELD

The present disclosure generally pertains to a time-of-flight apparatus and a method to operate the time-of-flight apparatus.

TECHNICAL BACKGROUND

Generally, time-of-flight (ToF) devices are known, for example for imaging or creating depth maps of a scene, such as an object, a person, or the like. It can be distinguished between direct ToF (dToF) or indirect ToF (iToF) by measuring a distance either by measuring the run-time of emitted and reflected light (dToF) or by measuring one or more phase-shifts of emitted and reflected light (iToF).

Known time-of-flight imaging devices measure, besides a signal (usually) produced by the ToF device, also ambient light, such as sunlight, which may cause noise in the measurement and therefore may deteriorate the image.

Therefore, it is generally desirable to provide a time-of-flight apparatus and a method which may improve a ratio between a signal and noise.

SUMMARY

According to a first aspect, the disclosure provides a time-of-flight apparatus, comprising a light source for emitting a light pulse to a scene; a photo-detection portion for detecting at least the light pulse reflected from the scene within a first photo-detection time interval, wherein the photo-detection portion includes at least one photo-detection element; and a measurement circuitry configured to: drive, within a measurement time interval including the first photo-detection time interval, the at least one photo-detection element for detecting the light pulse reflected from the scene, and drain, within the measurement time interval and after the first photo-detection time interval, electrons from the at least one photo-detection element.

According to a second aspect, the disclosure provides a method, comprising: emitting, by a light source, a light pulse to a scene; detecting, by a photo-detection portion, at least the light pulse reflected from the scene within a first photo-detection time interval, wherein the photo-detection portion includes at least one photo-detection element; and driving, by a measurement circuitry, within a measurement time interval including the first photo-detection time interval, the at least one photo-detection element for detecting the light pulse reflected from the scene, and draining, by the measurement circuitry, within the measurement time interval and after the first photo-detection time interval, electrons from the at least one photo-detection element.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
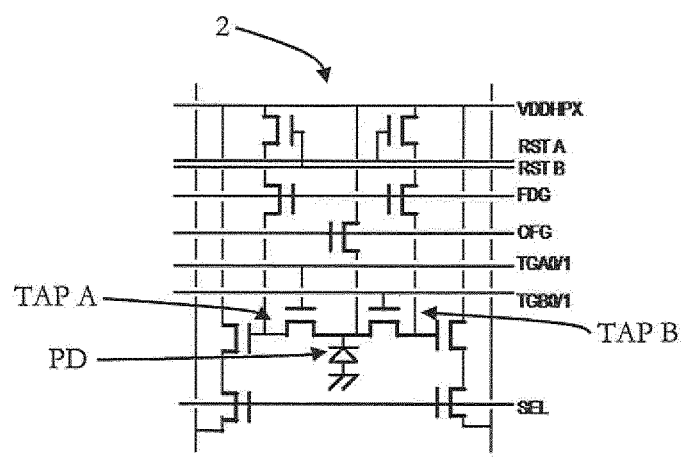
FIG. 2 shows a schematic structure of circuitry according to an embodiment of the present disclosure.

Before a detailed description of the embodiments under reference of FIG. 2 is given, general explanations are made.

As already explained in the outset, ambient light may deteriorate the signal of a ToF measurement, thereby altering the created depth map.

Generally, it is possible to increase the ratio between the signal, which is based on emitted light, and the noise, which is caused by ambient light, by increasing the power for emitting the light (pulses). However, for example, for eye safety reasons, the power of the emitted light may not exceed certain thresholds, which may be given in dependence on illumination light power, distance, eye pupil diameter and the like.

It has been recognized that the illumination power may be increased, in some embodiments, when simultaneously the duration of emission of the illumination power is decreased, whereby an eye safety may be provided and also a ratio between signal and noise may be increased.

Therefore, the present disclosure generally pertains to a time-of-flight apparatus, including: a light source for emitting a light pulse to a scene; a photo-detection portion for detecting at least the light pulse reflected from the scene within a first photo-detection time interval, wherein the photo-detection portion includes at least one photo-detection element; and a measurement circuitry configured to: drive, within a measurement time interval including the first photo-detection time interval, the at least one photo-detection element for detecting the light pulse reflected from the scene, and drain, within the measurement time interval and after the first photo-detection time interval, electrons from the at least one photo-detection element.

The time-of-flight apparatus may be implemented as a camera, for example, as a standalone device, or it may be combined with other camera techniques in order to create a depth map. The time-off-light apparatus may also be included or integrated in another device, such as a smartphone, tablet, handheld computer, a camera system, or the like.

Embodiments of the time-of-flight apparatus may be a based on different time-of-flight (ToF) technologies. Generally, ToF devices may be grouped into two main technologies, namely indirect ToF (iToF) and direct ToF (dToF), as indicated above.

A time-of-flight apparatus, which may be configured as an iToF camera, indirectly obtains the depth measurements by recovering the phase of a correlation wave, which is indicative of a phase shift between a modulated emitted light and the light received from being reflected by a scene. The photo-detection portion, e.g. configured as an iToF pixel sensor, demodulates, e.g. millions of illumination modulation cycles reflected from the scene for sampling the correlation wave (between the emitted modulated light signal and the received demodulated light signal or signals which are indicative of them), which is based on correlation obtained by correlating emitted and detected light.

In some embodiments, the time-of-flight apparatus, which is based on the dToF technology, directly obtains the depth measurements by measuring the time-of-flight of the photons emitted by the light source and reflected from the scene, e.g. based on hundreds of short illumination pulses emitted.

The light source may be a flash, a (pulsed) laser, a polychromatic or monochromatic, light source, or the like. The light source may include LEDs (light emitting diodes) or it may be based on VCSELs (vertical cavity surface emitting lasers), or the like. The light source may be configured as a pulsed-wave light source, which is configured to emit light pulses to a scene (region of interest or object or the like).

Generally, the photo-detection portion may be based on any type of known sensing technology for time-of-flight systems and may be based on, for example, CMOS (complementary metal-oxide semiconductor), CCD (charge coupled device), SPAD (single photon avalanche diode), CAPD (current assisted photodiode) technology, Gate type pixel technology or the like, wherein SPADs may be used for dToF based technologies and CAPDs or Gate type pixels may be used for iToF based technologies, wherein some embodiments pertain to Gate type photo detection portions (pixels) which may include (at least one) transfer gate, overflow gate, or the like, as described herein, wherein the Gate type photo detection portions may be based on iToF.

Moreover, the photo-detection portion may include one photo-detection element, e.g. a single pixel, or multiple photo-detection elements, e.g. multiple pixels, which may be arranged in an array, as it is generally known. The light detection, in particular, may have a small number of photo-detection elements (pixels) (e.g. 64 by 64 pixels), but in other embodiments, the number of pixels may be smaller (e.g. 32×32, 16×16, 16×32, etc.) or larger (e.g. 128×128 pixels, 128×256, 256×256, etc.).

The photo-detection elements may also be grouped, for example, into predetermined groups of photo-detection elements (for example four, eight, or the like), which are specifically arranged, for example in a row, in a column, in a square, in a rectangle or the like.

In some embodiments, the predetermined group of photo-detection elements may share a circuitry which, for example, is configured to read out information produced by the photo-detection elements. Moreover, in some embodiments, one phot-detection element includes two or more pixels, which may share a circuitry for reading out the pixel information.

Detecting at least the light pulse from the scene may include detecting only the light pulse. For example, when the time-of-flight apparatus is used in a dark room, only the reflected light pulse may be detected, since, in such a case, (nearly) no ambient light exists. In other embodiments, there may be ambient light present. For example, when the ToF apparatus is used outdoors, there may ambient light, for example from the sun, the moon, street lights, cars, or other light sources, which may be additionally detected by the photo-detection portion. Also in indoor situations ambient light may be present, e.g. due to other (artificial) illumination sources, sun light falling through windows into the room, etc.

The measurement circuitry may be circuitry included in the photo-detection element/portion or may be at least partially a standalone circuitry (conductively) coupled to the photo-detection portion, either directly or indirectly. The measurement circuitry may include components generally known in the art, such as a transistor, an overflow gate, a transfer gate, or the like, and also other components which are mentioned herein. Moreover, the measurement circuitry may be at least partially included in an overall operation/control circuitry of the time-of-flight apparatus. The measurement circuitry may further comprise a control, such as a processor, or the like, configured to control at least parts of the measurement circuitry, the photo-detection portion, or the like.

Drive the at least one photo-detection element may include the control of at least parts of the measurement circuitry, the photo-detection portion, or the like by a control unit, such as a processor, microcontroller, FPGA (Field-programmable gate array), or the like.

The measurement time interval may include a single or a plurality of time-intervals, in which the measurement circuitry, the photo-detection portion, or the like, is driven. The measurement time interval may be predetermined, for example by a manufacturer, may depend on material properties of the photo-detection portion, on the measurement circuitry, on an intensity of the emitted light pulse, or the like.

The first photo-detection time interval is included within the measurement time interval. The first photo-detection time interval may include a time interval in which at least the light pulse reflected from the scene is detected, or the like, as will also be discussed further below.

Draining electrons from the at least one photo-detection element may include discharging the photo-detection element by a modulation signal, driving of a gate, grounding, setting to a reference voltage, or the like.

The time after the first photo-detection time interval may be any time after the first photo-detection time interval, such as instantaneously after the first photo-detection time interval or after a predetermined time after the first photo-detection time interval is terminated, such as five nanoseconds, or the like.

Hence, in some embodiments, the emitted light pulse may have an increased illumination power (compared to known ToF technologies, where multiple light pulses are emitted), wherein this light pulse reflected from the scene may be mainly detected within the first photo-detection time interval. As the illumination power may be such high that the photo-detection element and/or the readout circuitry may be saturated by detecting the light pulse, draining the electrons acts against this saturation.

Thus, in some embodiments, the illumination power may be increased while simultaneously a duty cycle of a driving of different gates (which is explained further below) is decreased, which leads to e.g. a better signal-to-noise ratio without compromising eye-safety requirements.

In some embodiments, a pulse-width of the light pulse is shorter than the first photo-detection time interval. The first photo-detection time interval may be associated with a first readout of the photo-detection element, which is also referred to as Tap A further below.

The pulse-width may be a full width at half maximum (FWHM), 1/e width, $1/e^2$ width, or the like, of a gaussian distribution, lorentzian distribution, or the like, of the light pulse.

The pulse width may be of a factor of 5, 10, 100, 1000, or the like, shorter than the first photo-detection time interval.

In some embodiments, the measurement time interval is associated with a relaxation time of the at least one photo-detection element, which in turn is associated with the saturation discussed above.

The relaxation time may refer to a relaxation time of a semiconductor element in embodiments in which the at least one photo-detection element includes a semiconductor element. It may further refer to the time in which charges produced in the at least one photo-detection element are removed, either by a voltage applied to the at least one photo-detection element or by physical properties of the semiconductor element.

The measurement time may correspond to the relaxation time. In some embodiments, the measurement time is shorter than the relaxation time, whereas in other embodiments, the measurement time is longer than the relaxation time.

In some embodiments, the measurement time interval further includes at least a second photo-detection time interval after the first photo-detection time-interval. The second photo-detection time interval may be associated with Tap B, discussed further below.

The second photo-detection time interval may be as long as the first photo-detection time interval. In some embodiments, it may be shorter or longer.

In some embodiments, the measurement circuitry includes a first gate and at least a second gate, and a time in which the first gate is driven corresponds to the first photo-detection time interval and a time in which the at least second gate is driven corresponds to the second photo-detection time interval.

The first gate and at least the second gate may refer to a gate of a transistor, such as a transfer gate, overflow gate, or the like, known in the art, configured to collect a signal from the photo-detection element generated by the light pulse. In specific, the signal may be comprised of electrons, which are discharged to or discharged in the at least one photo-detection element in reaction to at least the light pulse.

The driving of the first gate and the driving of the at least second gate, for example by a modulation signal, may lead to the collection, measurement, draining, or the like, of the discharged electrons. In this respect, in some embodiments, the first/second photo-detection time interval may correspond to the time interval of the driving of the first/second gate.

In some embodiments, the draining of the at least one photo-detection element is performed by the measurement circuitry in the second photo-detection time interval.

In some embodiments, the measurement circuitry is further configured to reset the first gate and the at least second gate after the measurement time interval.

The resetting may be based on at least one reset signal causing the signals, charges, or the like, acquired by the first and the at least second gate to be set back to a predetermined value after a predetermined amount of time after the measurement time interval or instantaneously after the measurement time interval. The reset signal may reset a gate periodically or be combined with other reset techniques such as soft-reset in case of saturation of the gate, or the like.

In some embodiments, the second photo-detection time interval is longer than the first photo-detection time interval.

In specific, in some embodiments the light pulse may be measured mainly in the first photo-detection time interval (for example, 90% of the light pulse may be measured in the first photo-detection time interval). However, the first photo-detection time interval may not be long enough to drain the at least one photo-detection element. Therefore, the second photo-detection time interval may be implemented long enough to drain the electrons from the at least one photo-detection element.

In some embodiments, however, the second photo-detection time interval may serve for the purpose to measure ambient light in order to subtract an ambient light signal from an overall signal. In this case, the second photo-detection time interval may be chosen long enough to collect enough ambient light for performing the subtraction.

In some embodiments, both of the methods of choosing the second photo-detection time interval are combined.

In some embodiments, the measurement circuitry further includes an overflow gate, and the measurement time interval further includes an overflow time interval, wherein the at least one photo-detection element is drained.

The overflow gate may be a gate of a transistor, or the like, as described herein.

In some embodiments, a time in which the at least one overflow gate is driven corresponds to the overflow time interval.

Some embodiments pertain to a first gate, a second gate, and an overflow gate, wherein the light pulse is mainly (e.g. 90%) measured by the first gate in a first photo-detection time interval, ambient light is measured by the second gate in a second photo-detection time interval after the first photo-detection time interval, and the draining happens in an overflow time interval after the second photo-detection time interval.

Some embodiments pertain to a method for operating a time-of-flight apparatus (as discussed herein), including: emitting, e.g. by a light source, a light pulse to a scene; detecting, e.g. by a photo-detection portion, at least the light pulse reflected from the scene within a first photo-detection time interval, wherein, for example, the photo-detection portion includes at least one photo-detection element; and, for example, driving, e.g. by a measurement circuitry, within a measurement time interval including the first photo-detection time interval, the at least one photo-detection element for detecting the light pulse reflected from the scene, and draining, e.g. by the measurement circuitry, within the measurement time interval and after the first photo-detection time interval, electrons from the at least one photo-detection element, as described herein.

In some embodiments, a pulse-width of the light pulse is shorter than the first photo-detection time interval, as described herein.

In some embodiments, the measurement time interval is associated with a relaxation time of the at least one photo-detection element, as described herein.

In some embodiments, the measurement time interval further includes at least a second photo-detection time interval after the first photo-detection time-interval.

In some embodiments, as discussed, a measurement circuitry includes a first gate and at least a second gate, and a time in which the first gate is driven corresponds to the first photo-detection time interval and a time in which the at least second gate is driven corresponds to the second photo-detection time interval, as described herein.

Some embodiments pertain to draining, e.g. by the measurement circuitry, the at least one photo-detection element in the second photo-detection time interval, as described herein.

Some embodiments pertain to resetting, e.g. by the measurement circuitry, the first gate and the at least second gate after the measurement time interval, as described herein.

In some embodiments, the second photo-detection time interval is longer than the first photo-detection time interval.

In some embodiments the measurement circuitry further includes an overflow gate, and the measurement time interval further includes an overflow time interval, and the method further includes draining the at least one photo-detection element in the overflow time interval, as described herein.

In some embodiments, a time in which the at least one overflow gate is driven corresponds to the overflow time interval, as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 1:
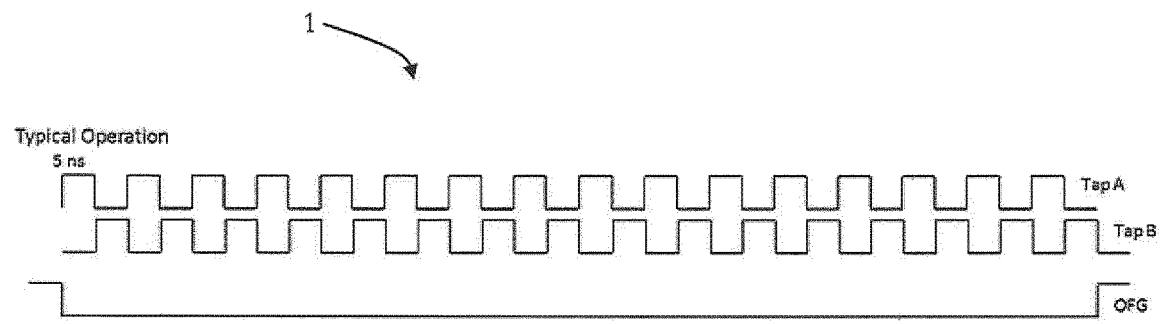
FIG. 1 shows a schematic diagram of a known operation of signals of a first transfer gate Tap A, a second transfer gate Tap B and an overflow gate OFG.

FIG. 1 shows a schematic diagram 1 of a typical operation of signals of a first transfer gate Tap A, of a second transfer gate Tap B and an overflow gate OFG, wherein the Tap A, Tap G and OFT are generally known. The horizontal value of the signal corresponds to a time-axis, whereas the vertical value of the signal corresponds to a signal intensity, wherein the signal intensity is, for the sake of simplicity, either zero or one (off or on).

The signal is generated by a control unit (not illustrated), wherein a predetermined voltage is applied to the respective gate in order to detect a photo voltage of a photo-detection element, as described herein. This process is commonly known as modulation.

In a state in which the OFG is turned off, Tap A is in an operational mode (turned on) for five nanoseconds and turned off for five nanoseconds. This is commonly known as a pulse width modulation. After that, this procedure is repeated, defining a periodic operation of Tap A. In this context, a duty cycle of Tap A is here defined by calculating the ratio between the time in which Tap A is turned on and the duration of a whole period (ten nanoseconds). In this example, the duty cycle of Tap A is (roughly) 50%, as it is generally known.

Tap B is turned off for five nanoseconds when Tap A is turned on, and Tap B is turned on for five nanoseconds when Tap A is turned off, also operating periodically in a duty cycle of 50%. In general, this is called a phase shift of 180 degrees, as it is common in the art.

The operation of Tap A and Tap B is exemplary repeated for sixteen periods. After these sixteen periods, Tap A and Tap B are turned off and the OFG is turned on.

To a person skilled in the art, it may be obvious that the present example is not limited to a duration of the periods of ten nanoseconds or a repetition of sixteen cycles before the overflow gate is turned on. Also shorter or longer numbers of the period times or the cycles are possible. The number of cycles may be chosen depending on a saturation of the photo-detection element, or the like.

FIG. 2 shows a schematic structure of circuitry 2 according to an embodiment of the present disclosure, wherein a photodiode PD provided in the lower part is a photo-detection element.

A structure TAP A and a structure TAP B is provided, wherein electrons generated by the photo-detection element PD may either be drained through TAP A or TAP B in dependence on a control signal applied to TAP A and TAP B, respectively.

The circuitry includes a selection transistor SEL, a first transfer gate TGA0/1 for driving TAP A, a second transfer gate TGB0/1 for driving TAP B, an overflow gate OFG, a capacity switch FDG, a first reset gate RST A, a second reset gate RST B, and a power supply voltage VDDHPX.

The selection transistor SEL is brought into an active state by a drive signal applied to the gate electrode of the selection transistor SEL and a photo-detection element connected to the selection transistor SEL is set into an active state.

When the first transfer gate TGA0/1 is set in an active state by a corresponding signal, charge stored in the photo-detection element is transferred through TAP A to a first charge-to-voltage converter (not displayed), for example a floating diffusion region, connected to TGA0/1.

When the second transfer gate TGB0/1 is set in an active state by a corresponding signal, charge stored in the photo-detection element is transferred through TAP B to a second charge-to-voltage converter (not displayed), for example a floating diffusion region, connected to TGB0/1.

When the overflow gate OFG is set in an active state by a corresponding signal, the photo-detection element is grounded.

The capacity switch, when set in an active state by a corresponding signal, connects the first charge-to-voltage converter and a first charge storage (not displayed), for example a capacitor. When set in an inactive state, for example by the absence of the corresponding signal, the second charge-to-voltage converter is connected to the second charge storage.

The first (second) reset gate RST A (RST B) has a drain connected to a power supply (not displayed) supplying the power supply voltage VDDHPX and a source connected to the first (second) charge-to-voltage converter. By a reset signal applied to a gate electrode of the first (second) reset gate RST A (RST B), the first (second) charge to voltage converter is reset to the power supply voltage VDDHPX.

With the circuitry described with reference to FIG. 2, a pulse width modulation of the first and the second transfer gate are achieved, as will be explained with reference to FIG. 3.

Figure 3:
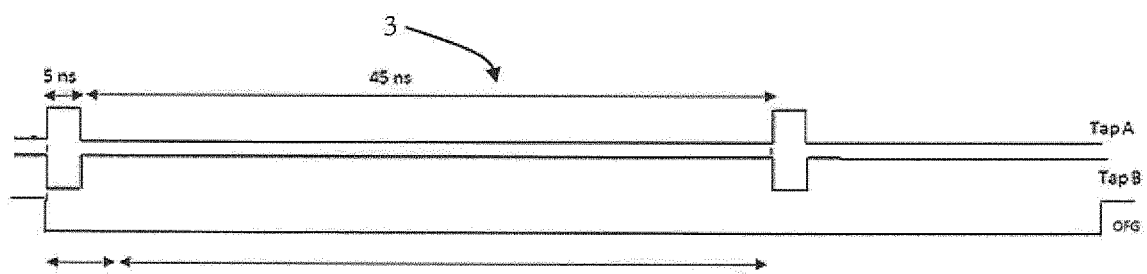
FIG. 3 shows a diagram of an operation of signals Tap A and Tap B according to an embodiment of the present disclosure.

FIG. 3 shows a diagram of an operation of the signals Tap A (for TAP A) and Tap B (for TAP B) according to an embodiment of the present disclosure.

Tap A is turned on for five nanoseconds (first photo-detection time interval) and after that, it is turned off for forty-five nanoseconds, operating in a duty cycle of 10%.

Tap B is initially turned off for five nanoseconds and after that it is turned on for 45 nanoseconds, operating in a duty cycle of 90%, wherein the electrons are drained mainly during the Tap B time interval (second photo-detection time interval).

The first and the second photo-detection time interval sum up to 50 nanoseconds, the measurement time interval.

The phase-shift of Tap A and Tap B is 180 degrees in this embodiment.

Tap A is turned on again for five nanoseconds (first photo-detection time interval) and turned off for twenty nanoseconds (second photo-detection time interval), wherein Tap B is still 180 degrees phase-shifted to Tap A. After the second cycle, the overflow gate OFG is turned on.

Figure 4:
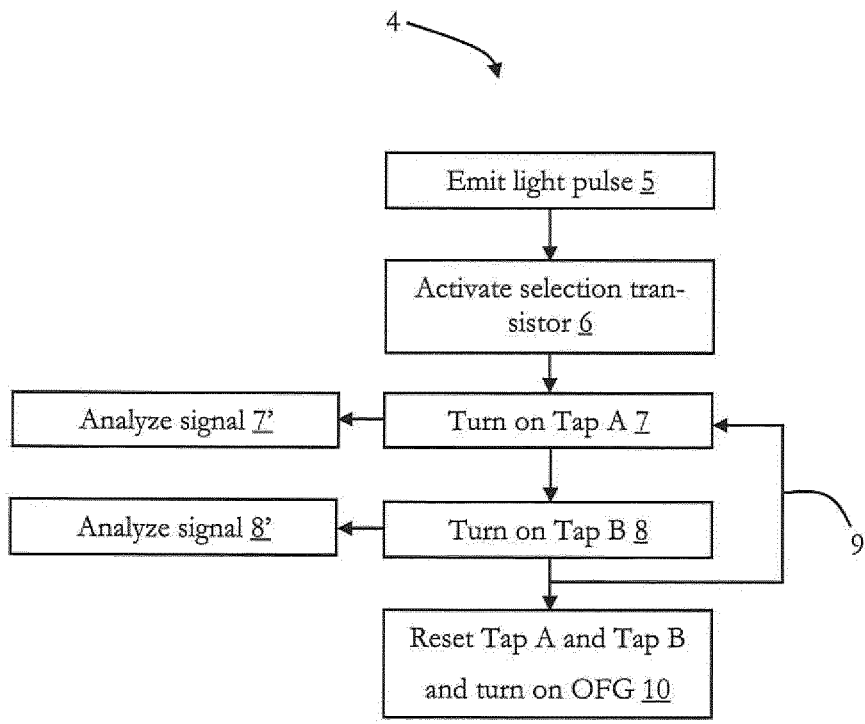
FIG. 4 shows a diagram for operating a time-of-flight apparatus according to an embodiment of the present disclosure.

FIG. 4 shows a diagram 4 of operating a time-of-flight apparatus according to an embodiment of the present disclosure, wherein the time-of-flight apparatus of FIGS. 2 and 3 is exemplary referred to for the description.

In 5, a light pulse is emitted, which is shorter than a first photo-detection time interval of five nanoseconds, in which Tap A is turned on.

In 6, the photo-detection element is activated by activating the selection transistor.

In 7, Tap A is turned on for five nanoseconds (first photo-detection time interval) and charge, which is discharged from the photo-detection element in response to the reflected light pulse and ambient light is transferred to the first charge-to-voltage converter.

The voltage, which is measured at the first charge-to-voltage converter, is then analyzed in 7'.

In 8, Tap B is turned on for forty-five nanoseconds (second photo-detection time interval) and charge, which is discharged from the photo-detection element in response to the reflected light pulse and ambient light is transferred to the second charge-to-voltage converter.

The voltage, which is measured at the second charge-to-voltage converter, is then analyzed in 8'.

Typically, most of the signal caused by reflected light pulse (e.g. 90%) is recorded by Tap A, i.e. in 7.

In 9, procedures 7, 7', 8, 8' are repeated for a predetermined amount of times. In this embodiment, these procedures are repeated once, but in other embodiments the process may be repeated a higher amount of times or not at all. Also, in the repetition off- and on-times of the respective Taps may vary, as, for example in this embodiment, the off-time (on-time) of Tap A (B) is twenty nanoseconds at the repetition in 9.

Then, in 10, Tap A and Tap B are reset and the overflow gate is turned on, as described herein.

Figure 5:
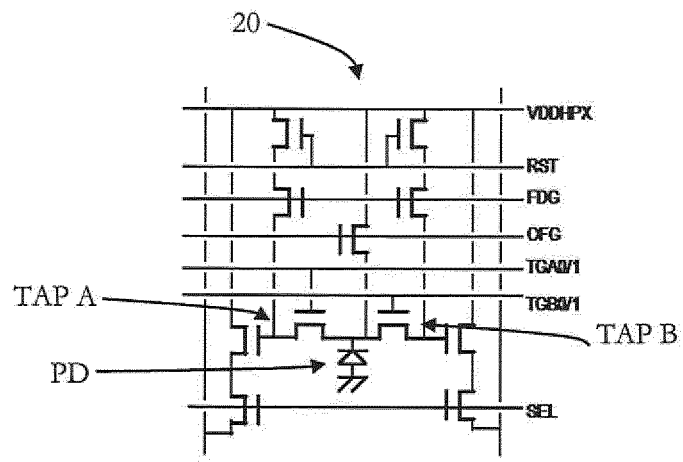
FIG. 5 shows circuitry according to an embodiment according to the present disclosure.

FIG. 5 shows a circuitry 20 according to another embodiment according to the present disclosure, wherein the time interval for Tap B (second photo-detection time interval) is not elongated, but has the same duration is the time interval for Tap A (first photo-detection time interval), but instead the OFG is driven for draining electrons (in an overflow time interval). The circuitry 20 structurally mainly corresponds to the circuitry 2 described with reference to FIG. 2, therefore the repeated description of the corresponding components is omitted. The only difference to the circuitry 2 described with reference to FIG. 2 is that the circuitry 20 depicted in FIG. 5 only has one reset gate for resetting both transfer gates TGA0/1 and TGB0/1 at the same time, whereas the circuitry of FIG. 2 has two reset gates.

The circuitry 20 described with reference to FIG. 5 allows a driving of the transfer gates and the overflow gates according to FIG. 6, which depicts the signals Tap A and Tap B applied to TAP A and TAP, respectively, and a signal OFG applied to OFG.

Figure 6:
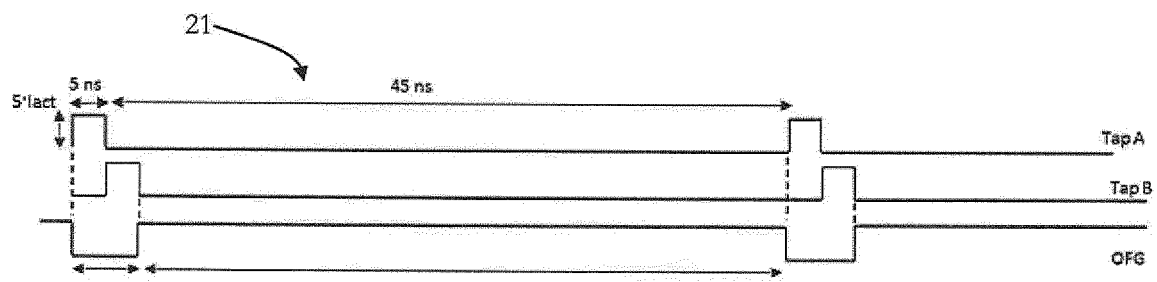
FIG. 6 shows a diagram of an operation of signals Tap A and Tap B and an overflow gate according to an embodiment of the present disclosure.

In FIG. 6, Tap A and Tap B are turned on for five nanoseconds (first and second photo-detection time interval) and turned off for forty-five nanoseconds (overflow time interval), resulting in a duty cycle of 10%, wherein Tap A and Tap B are 180 degrees phase-shifted. When Tap A or Tap B are turned on, the OFG is turned off and when Tap A and Tap B are turned off, the OFG is turned on, resulting in a duty cycle of the OFG of 80%. After a total of fifty nanoseconds (measurement time interval), the process is repeated and the gates may be reset after a predetermined amount of cycles by the reset gate.

Figure 7:
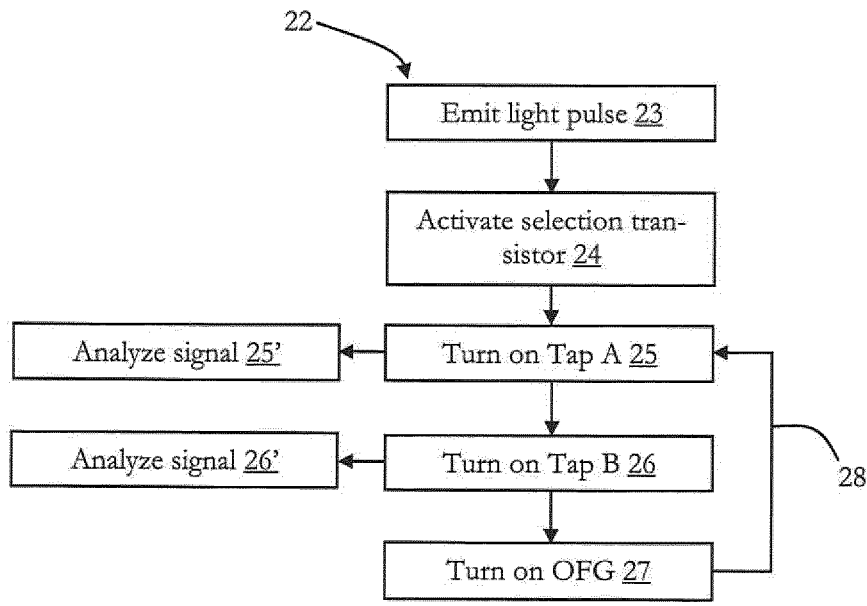
FIG. 7 shows a diagram of operating a time-of-flight apparatus according to an embodiment of the present disclosure.

FIG. 7 shows a diagram 22 of operating a time-of-flight apparatus according to an embodiment of the present disclosure.

In 23, a light pulse is emitted, which is shorter than a first photo-detection time interval of five nanoseconds, in which Tap A is turned on.

In 24, the photo-detection element is activated by activating the selection transistor.

In 25, Tap A is turned on for five nanoseconds (first photo-detection time interval) and charge, which is discharged from the photo-detection element in response to the reflected light pulse and ambient light is transferred to the first charge-to-voltage converter.

The voltage, which is measured at the first charge-to-voltage converter, is then analyzed in 25'.

In 26, Tap B is turned on for five nanoseconds (second photo-detection time interval) and charge, which is discharged from the photo-detection element in response to the reflected light pulse and ambient light is transferred to the second charge-to-voltage converter.

The voltage, which is measured at the second charge-to-voltage converter, is then analyzed in 26'.

Typically, most of the signal caused by reflected light pulse (e.g. 90%) is detected within time interval of Tap A (first photo-detection time interval), i.e. in 25.

Then, in 27, the overflow gate is turned on for forty nanoseconds (overflow time interval).

In 28, the steps 25 to 27 are repeated for a predetermined amount of times. In this embodiment, the steps are repeated once, but in other embodiments the process may be repeated a higher amount of times or not at all. Also, in the repetitions off- and on-times of the respective Taps and the OFG may vary.

After the predetermined amount of times in which the cycle is repeated, the respective gates can be reset by the reset gate.

Figure 8:
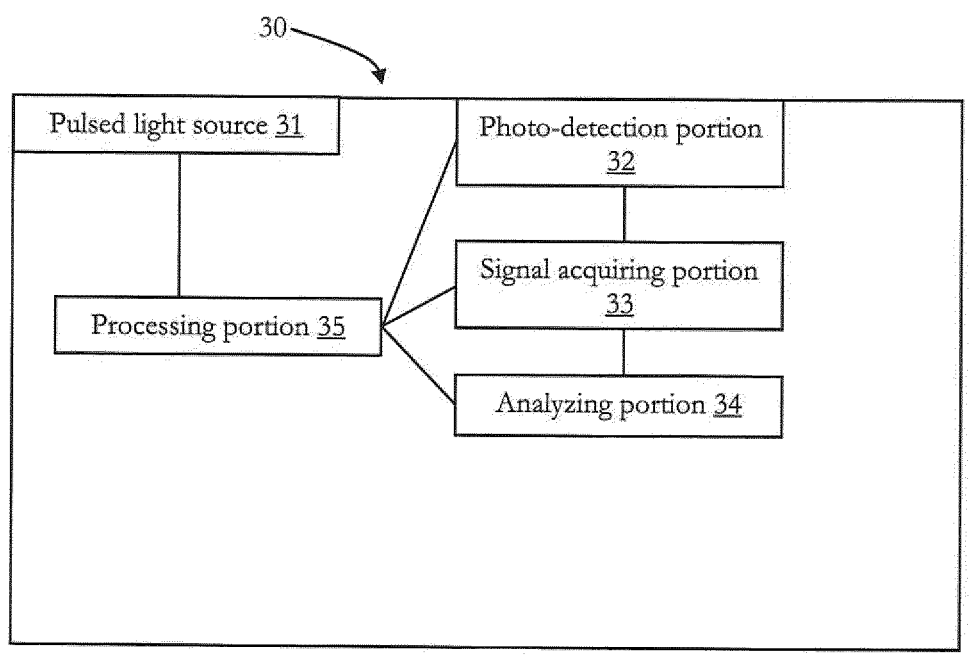
FIG. 8 shows a time-of-flight apparatus according to the present disclosure.

FIG. 8 shows a time-of-flight apparatus 30 according to the present disclosure configured to perform the methods as described herein.

The time-of-flight apparatus 30 includes a pulsed light-source 31, a photo-detection portion 32, a signal acquiring portion 33, an analyzing portion 34, and a processing portion 35.

The pulsed light source 31 is configured to emit a light pulse, as described herein.

The photo-detection portion 32 is based on a photo-detection technology as described herein and further includes a photo-detection element as described herein.

The signal acquiring portion 33 may include circuitry or parts of circuitry according to the present disclosure.

The analyzing portion 34 is connected to the signal acquiring portion and analyzes the signal acquired via the transfer gates, as described herein.

The processing portion 35 is for example a central processing unit (CPU) configured to control the signals for triggering the pulsed light source 31, the photo-detection portion 32, the signal acquiring portion 33, and the analyzing portion 34 and components, which are included in these, such as the circuitry according to the present disclosure.

Figure 9:
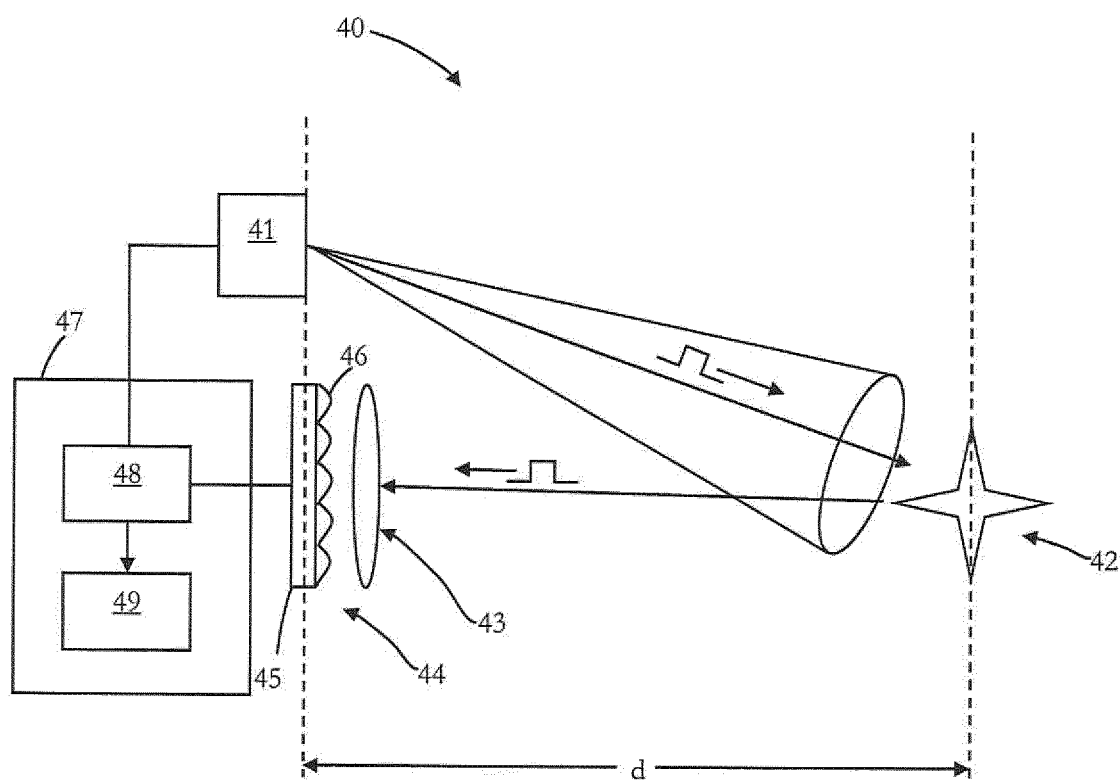
FIG. 9 shows a time-of-flight device according to an embodiment of the present disclosure.

Referring to FIG. 9, there is illustrated an embodiment of a time-of-flight (ToF) device 40, which can be used for depth sensing or providing a distance measurement, in particular for the technology as discussed herein, wherein ToF device 40 is configured as an iToF camera 40. The ToF device 40 has a circuitry 47 which is configured to perform the methods as discussed herein and which forms a control of the ToF device 40 (and it includes, not shown, corresponding processors, memory and storage as it is generally known to the skilled person).

The ToF device 40 has a pulsed light source 41 and it includes light emitting elements (based on laser diodes), wherein in the present embodiment, the light emitting elements are narrow band laser elements.

The light source 41 emits pulsed light, i.e. pulse density modulates light pulses, as discussed herein, to a scene 42 (region of interest or object), which reflects the light. By repeatedly emitting light to the scene 42, the scene 42 can be scanned, as it is generally known to the skilled person. The reflected light is focused by an optical stack 43 to a light detector 44.

The light detector 44 has an image sensor 45, which is implemented based on multiple Gate-type pixels and a microlens array 46 which focuses the light reflected from the scene 42 to the image sensor 45 (to each pixel of the image sensor 45).

The light emission time and modulation information is fed to the circuitry or control 47 including a time-of-flight measurement unit 48, which also receives respective information from the image sensor 45, when the light is detected which is reflected from the scene 42. On the basis of the light waveform represented by the emitted pulse density modulated light pulses received from the light source 41 and the performed demodulation, the time-of-flight measurement unit 48 computes a phase shift of the received light pulses which have been emitted from the light source 41 and reflected by the scene 42 and on the basis thereon it computes a distance d (depth information) between the image sensor 45 and the scene 42, as also discussed above.

The depth information is fed from the time-of-flight measurement unit 48 to a 3D image reconstruction unit 49 of the circuitry 47, which reconstructs (generates) a 3D image of the scene 42 based on the depth information received from the time-of-flight measurement unit 48.

It should be recognized that the embodiments describe methods with an exemplary ordering of method steps. The specific ordering of method steps is however given for illustrative purposes only and should not be construed as binding. For example the ordering of 5 and 6 in the embodiment of FIG. 4 may be exchanged. Also, the ordering of 23 to 27 in the embodiment of FIG. 7 may be exchanged. Other changes of the ordering of method steps may be apparent to the skilled person.

Please note that the division of the time-of-flight apparatus 30 into units 31 to 35 is only made for illustration purposes and that the present disclosure is not limited to any specific division of functions in specific units. For instance, the signal acquiring portion 33 could be implemented by a respective programmed processor, field programmable gate array (FPGA) and the like.

The methods can also be implemented as a computer program causing a computer and/or a processor, such as processor 35 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight apparatus, comprising:
a light source for emitting a light pulse to a scene;
a photo-detection portion for detecting at least the light pulse reflected from the scene within a first photo-detection time interval, wherein the photo-detection portion includes at least one photo-detection element; and
a measurement circuitry configured to:
drive, within a measurement time interval including the first photo-detection time interval, the at least one photo-detection element for detecting the light pulse reflected from the scene, and
drain, within the measurement time interval and after the first photo-detection time interval, electrons from the at least one photo-detection element.

(2) The time-of-flight apparatus of (1), wherein a pulse-width of the light pulse is shorter than the first photo-detection time interval.

(3) The time-of-flight apparatus of anyone of (1) or (2), wherein the measurement time interval is associated with a relaxation time of the at least one photo-detection element.

(4) The time-of flight apparatus of anyone of (1) to (3), wherein the measurement time interval further includes at least a second photo-detection time interval after the first photo-detection time-interval.

(5) The time-of-flight apparatus of anyone of (1) to (4), wherein the measurement circuitry includes a first gate and at least a second gate, and wherein a time in which the first gate is driven corresponds to the first photo-detection time interval and a time in which the at least second gate is driven corresponds to the second photo-detection time interval.

(6) The time-of-flight-apparatus of anyone of (1) to (5), wherein the draining of the at least one photo-detection element is performed by the measurement circuitry in the second photo-detection time interval.

(7) The time-of-flight apparatus of anyone of (1) to (6), wherein the measurement circuitry is further configured to reset the first gate and the at least second gate after the measurement time interval.

(8) The time-of-flight apparatus of anyone of (1) to (7), wherein the second photo-detection time interval is longer than the first photo-detection time interval.

(9) The time-of-flight apparatus of anyone of (1) to (8), wherein the measurement circuitry further includes an overflow gate, and wherein the measurement time interval further includes an overflow time interval, in which the at least one photo-detection element is drained.

(10) The time-of-flight apparatus of anyone of (1) to (9), wherein a time in which the at least one overflow gate is driven corresponds to the overflow time interval.

(11) A method for operating a time-of-flight apparatus, comprising:
emitting a light pulse to a scene;
detecting at least the light pulse reflected from the scene within a first photo-detection time interval with at least one photo-detection element; and
detecting the light pulse reflected from the scene, and draining within the measurement time interval and after the first photo-detection time interval, electrons from the at least one photo-detection element.
(12) The method of (11), wherein a pulse-width of the light pulse is shorter than the first photo-detection time interval.
(13) The method of anyone of (11) or (12), wherein the measurement time interval is associated with a relaxation time of the at least one photo-detection element.
(14) The method of anyone of (11) to (13), wherein the measurement time interval further includes at least a second photo-detection time interval after the first photo-detection time-interval.
(15) The method of anyone of (11) to (14), wherein a measurement circuitry of the time-of-flight apparatus includes a first gate and at least a second gate, and wherein a time in which the first gate is driven corresponds to the first photo-detection time interval and a time in which the at least second gate is driven corresponds to the second photo-detection time interval.
(16) The method of anyone of (11) to (15), further comprising draining the at least one photo-detection element in the second photo-detection time interval.
(17) The method of anyone of (11) to (16), further comprising resetting the first gate and the at least second gate after the measurement time interval.
(18) The method of anyone of (11) to (17), wherein the second photo-detection time interval is longer than the first photo-detection time interval.
(19) The method of anyone of (11) to (18), wherein the measurement circuitry further includes an overflow gate, and wherein the measurement time interval further includes an overflow time interval, the method further comprising draining the at least one photo-detection element in the overflow time interval.
(20) The method of anyone of (11) to (19), wherein a time in which the at least one overflow gate is driven corresponds to the overflow time interval.
(21) A computer program comprising program code causing a computer to perform the method according to anyone of (11) to (20), when being carried out on a computer.
(22) A non-transitory computer-readable recording medium that stores therein a computer program product, which, when executed by a processor, causes the method according to anyone of (11) to (20) to be performed.

The invention claimed is:

1. A time-of-flight apparatus, comprising:
a light source for emitting a light pulse to a scene;
a photo-detection portion for detecting at least the light pulse reflected from the scene within a first photo-detection time interval, wherein the photo-detection portion includes at least one photo-detection element; and
a measurement circuitry configured to:
drive, within a measurement time interval including the first photo-detection time interval, the at least one photo-detection element for detecting the light pulse reflected from the scene, and
drain, within the measurement time interval and after the first photo-detection time interval, electrons from the at least one photo-detection element wherein the measurement circuitry further includes an overflow gate, and wherein the measurement time interval further includes an overflow time interval, in which the at least one photo-detection element is drained.

2. The time-of-flight apparatus of claim 1, wherein a pulse-width of the light pulse is shorter than the first photo-detection time interval.

3. The time-of-flight apparatus of claim 1, wherein the measurement time interval is associated with a relaxation time of the at least one photo-detection element.

4. The time-of flight apparatus of claim 1, wherein the measurement time interval further includes at least a second photo-detection time interval after the first photo-detection time-interval.

5. The time-of-flight apparatus of claim 4, wherein the measurement circuitry includes a first gate and at least a second gate, and wherein a time in which the first gate is driven corresponds to the first photo-detection time interval and a time in which the at least second gate is driven corresponds to the second photo-detection time interval.

6. The time-of-flight-apparatus of claim 5, wherein the draining of the at least one photo-detection element is performed by the measurement circuitry in the second photo-detection time interval.

7. The time-of-flight apparatus of claim 5, wherein the measurement circuitry is further configured to reset the first gate and the at least second gate after the measurement time interval.

8. The time-of-flight apparatus of claim 4, wherein the second photo-detection time interval is longer than the first photo-detection time interval.

9. The time-of-flight apparatus of claim 1, wherein a time in which the at least one overflow gate is driven corresponds to the overflow time interval.

10. A method for operating a time-of-flight apparatus, comprising:
emitting a light pulse to a scene;
detecting at least the light pulse reflected from the scene within a first photo-detection time interval with at least one photo-detection element; and
detecting the light pulse reflected from the scene, and draining within the measurement time interval and after the first photo-detection time interval, electrons from the at least one photo-detection element
wherein the measurement circuitry further includes an overflow gate, and wherein the measurement time interval further includes an overflow time interval, the method further comprising draining the at least one photo-detection element in the overflow time interval.

11. The method of claim 10, wherein a pulse-width of the light pulse is shorter than the first photo-detection time interval.

12. The method of claim 10, wherein the measurement time interval is associated with a relaxation time of the at least one photo-detection element.

13. The method of claim 10, wherein the measurement time interval further includes at least a second photo-detection time interval after the first photo-detection time-interval.

14. The method of claim 13, wherein a measurement circuitry of the time-of-flight apparatus includes a first gate and at least a second gate, and wherein a time in which the first gate is driven corresponds to the first photo-detection time interval and a time in which the at least second gate is driven corresponds to the second photo-detection time interval.

15. The method of claim 14, further comprising draining the at least one photo-detection element in the second photo-detection time interval.

16. The method of claim 14, further comprising resetting the first gate and the at least second gate after the measurement time interval.

17. The method of claim 13, wherein the second photo-detection time interval is longer than the first photo-detection time interval.

18. The method of claim 10, wherein a time in which the at least one overflow gate is driven corresponds to the overflow time interval.

* * * * *